United States Patent
Kanamaki

[11] Patent Number: 5,963,639
[45] Date of Patent: Oct. 5, 1999

[54] TELEPHONE HAVING AN AUDIO RESPONSE FUNCTION

[75] Inventor: Masahiko Kanamaki, Saitama-ken, Japan

[73] Assignee: Pioneer Electronic Corporation, Tokyo, Japan

[21] Appl. No.: 08/914,613

[22] Filed: Aug. 21, 1997

[30] Foreign Application Priority Data

Aug. 21, 1996 [JP] Japan .................................. 8-238605

[51] Int. Cl.⁶ .................................................. H04M 3/00
[52] U.S. Cl. ...................... 379/418; 379/88.01; 379/387
[58] Field of Search .............................. 379/418, 88.01, 379/387, 388, 389, 390

[56] References Cited

U.S. PATENT DOCUMENTS

| | | | |
|---|---|---|---|
| 3,636,458 | 1/1972 | Sugiyama et al. ...................... | 328/151 |
| 5,398,281 | 3/1995 | Kurokawa et al. ...................... | 379/390 |
| 5,615,256 | 3/1997 | Yamashita .............................. | 379/390 |

*Primary Examiner*—N. Le
*Assistant Examiner*—Shih-Wen Hsieh
*Attorney, Agent, or Firm*—Sughrue, Mion, Zinn, Macpeak & Seas, PLLC

[57] ABSTRACT

A microphone system is provided for picking up ambient sounds including noises and for producing a sound voltage signal. A threshold is obtained from the sound voltage signal for determining a response voice spoken by an addressee in response to the bell tone. A response sound voltage based on the response voice is compared with the threshold, and a response voice signal is produced when the comparison is established. In response to the response voice signal, a line of the telephone is closed.

5 Claims, 8 Drawing Sheets

FIG.2 a

"HAHI"

PRIOR ART

PRIOR ART

PRIOR ART

TELEPHONE HAVING AN AUDIO RESPONSE FUNCTION

BACKGROUND OF THE INVENTION

The present invention relates to a telephone having an automatic audio response function wherein an addressee can answer a telephone call without picking up a handset thereof.

A telephone which can be used hands-free is becoming widespread. Such a telephone is convenient when the addressee has her hands full.

In a conventional telephone with the automatic audio response function, in order to connect the line to the telephone when the telephone bell rings, a hands-free button is operated. In another type, the line is automatically connected with the telephone by speaking to the telephone.

Figure 7:
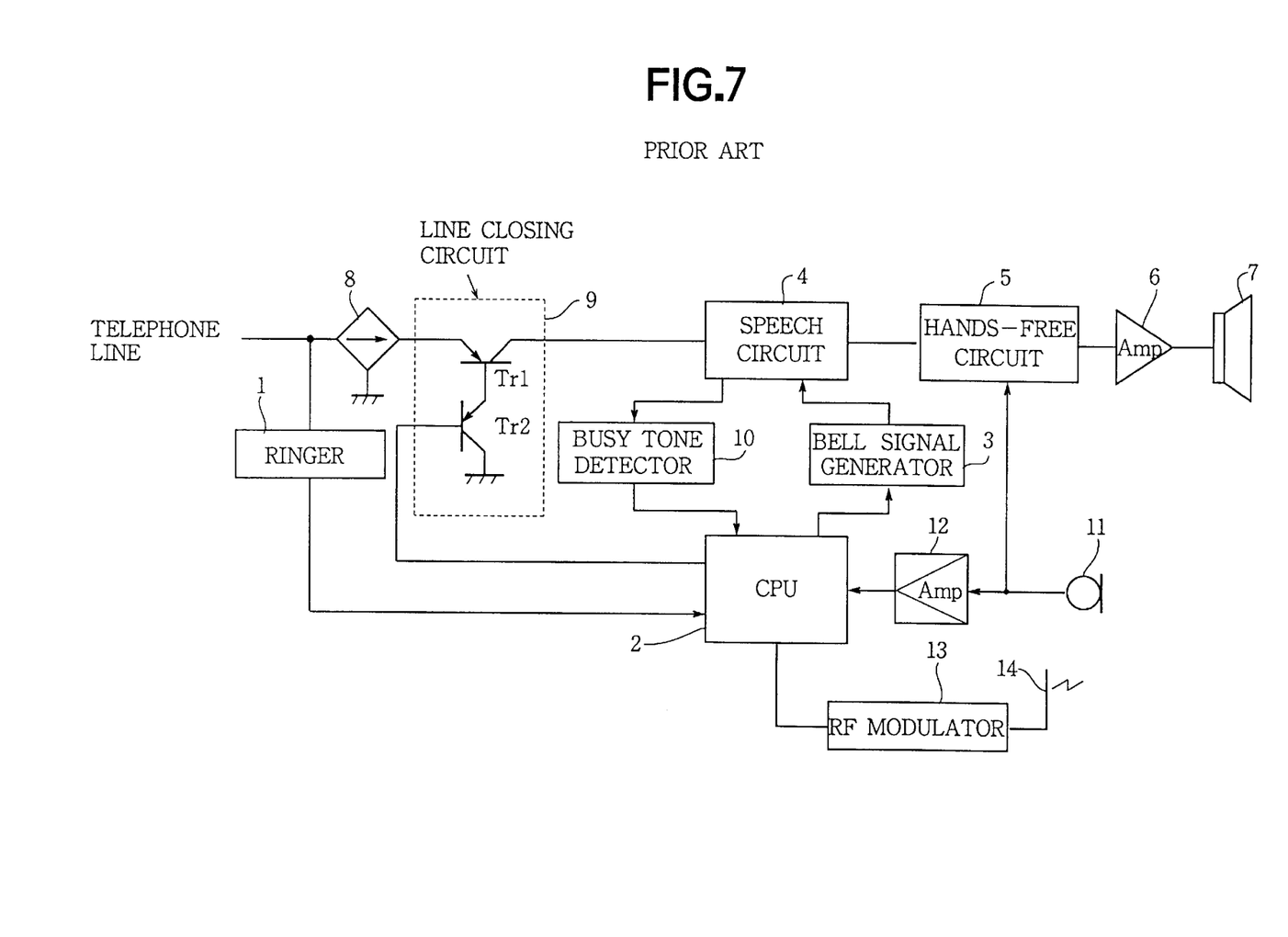
FIG. 7 is a block diagram of a conventional telephone having an automatic audio response function.

FIG. 7 is a block diagram showing an example of the conventional main telephone of the latter type.

Referring to FIG. 7, when a ringer 1 detects a bell signal coming through a telephone line, a CPU 2 applies a control signal to a bell signal generator 3, which in response applies a ring signal to a speaker 7 through a speech circuit 4, hands-free circuit 5, and an amplifier 6. Thus the bell tone is sounded through the speaker 7. The bell signal is usually fed at a cycle of the ON of one second with a pause of two seconds therebetween. When a microphone 11 picks up a vocal response during the pause of the bell within a predetermined time, the vocal sound is applied to the CPU 2 through an amplifier 12. The CPU 2 accordingly feeds a closing signal to a line closing circuit 9 comprising a pair of transistors Tr1 and Tr2, rendering the transistors conductive. Hence a voice signal from the other end of the line is transmitted to the speaker 7 through a rectifier 8, line closing circuit 9, speech circuit 4, hands-free circuit 5 and the amplifier 6. Namely, the voice of the caller can be heard from the speaker without operating any button on the telephone. The voice of the addressee picked up by the microphone 11 is transmitted to the hands-free circuit 5, amplified at the speech circuit 4 and further transmitted to the addresser.

After the conversation is over, when the addresser puts the handset of the addresser's telephone on the cradle, a busy tone signal is fed from the addresser's telephone to the addressee's telephone through the telephone line. The busy tone signal is applied to a busy tone detector 10 which detects the signal. As a result, the CPU 2 applies an open signal to the line closing circuit 9 to disconnect the line.

Figure 8:
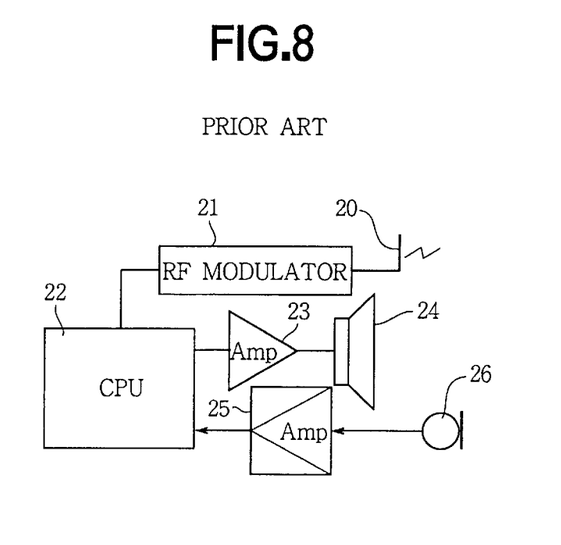
FIG. 8 is a block diagram of a conventional cordless telephone used in association with the telephone of FIG. 7.

The call can also be made to a cordless telephone shown in FIG. 8 through the main telephone of FIG. 7. The bell signal fed to the main telephone is applied to the cordless telephone through an RF modulator 13 and an antenna 14 of the main telephone.

Referring to FIG. 8, an antenna 20 receives the bell signal and applies it to a CPU 22 through an RF modulator 21. The CPU 22 accordingly applies a ring demand signal to a speaker 24 through an amplifier 23, thereby ringing a bell. When a voice is picked up by a microphone 26 during the pause of the bell within a predetermined time, the CPU 22 applies a response signal to the CPU 2 of the main telephone through the RF modulator 21, antennas 20 and 14 and the RF modulator 13. The CPU 2 thus applies the closing signal to the line closing circuit 9 as described above, thereby making a connection. Thus the hands-free transmission becomes possible.

When the addresser puts down the handset, the busy tone signal is fed to the main telephone and detected by the busy tone detector 10. The CPU 2 accordingly transmits a signal demanding the termination of the transmission to the cordless telephone, and automatically cuts off the line.

Such a conventional telephone with the automatic audio response function often interprets intermittent noises in a noisy surroundings as a vocal response to the bell, thereby erroneously connecting the line. In order to prevent the erroneous operation, the applicant of the present invention has proposed in Japanese Patent Application No. 7-101099, a telephone wherein a threshold for determining the vocal response and inducing the connection of the line is changed in accordance with the conditions of the ambient sound field of the telephone.

Figure 9:
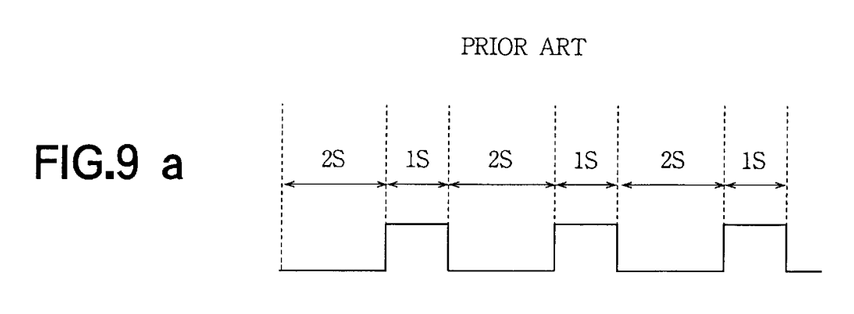

More particularly, as shown in FIG. 9a, the bell signal is usually transmitted at a cycle of one second with an interval of two seconds. As shown in FIG. 9b, the bell is sounded alternately at 791 Hz and 631 Hz at a cycle of 48 ms each in order that sufficient sound pressure is maintained and that a mellow sound quality of the bell is obtained.

Figure 10:
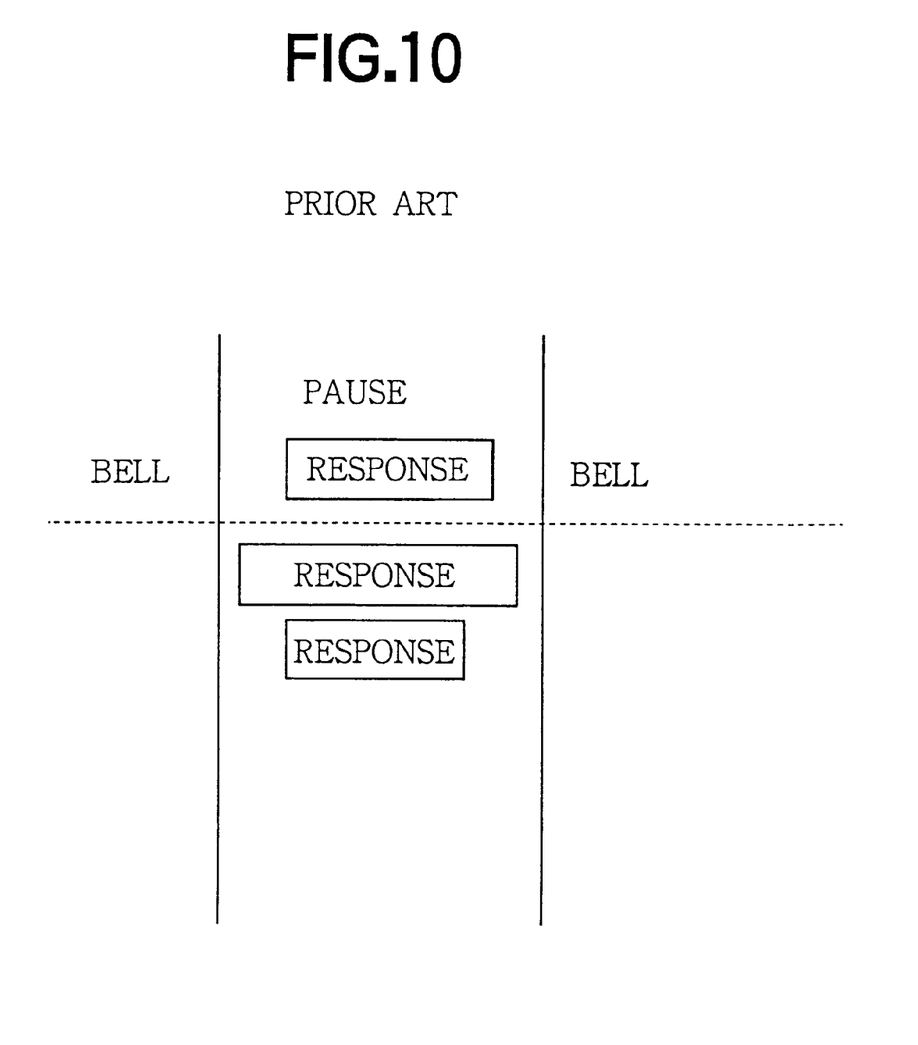
FIG. 10 is a graph describing the operation of the conventional telephone of FIG. 7.

On the other hand, the energy of the human voice such as "Yes!" responding to the bell is concentrated in a range under 800 Hz regardless of the sex. Namely, the frequencies of the bell and of the voice overlap with each other so that the voice cannot be detected while the telephone is ringing. Thus the detection of the response is suspended while the telephone is ringing, and carried out only during the pause. Namely, the hands-free operation is executed when the level of the voice input through the microphone exceeds a predetermined threshold within a predetermined time and determined as a response, and during the pause of the bell as shown in FIG. 10. Hence, the addressee intentionally has to speak out while the telephone is silent, which is quite troublesome.

SUMMARY OF THE INVENTION

An object of the present invention is to provide a telephone having an automatic audio response function wherein the line can be connected even while the telephone is ringing.

According to the present invention, there is provided a telephone having an audio response function, the telephone having a bell signal generator to generate a bell tone in response to an incoming call, comprising, a microphone system for picking up ambient sounds including noises and for producing a sound voltage signal, threshold determining means for generating a threshold from the sound voltage signal for determining a response voice spoken by an addressee in response to the bell tone, response determining means for comparing a response sound voltage fed from the microphone system which response sound voltage is based on the response voice with the threshold, and for producing a response voice signal when the comparison is established, and closing means responsive to the response voice signal for closing a line of the telephone.

The telephone further comprises average calculator means for calculating an average of the noises picked up by the microphone system. The threshold determining means is provided for determining the threshold in accordance with the average.

Sound field detector means is provided for comparing a present sound voltage signal with the average and for producing a sound field condition signal. The threshold determining means is provided for determining the threshold in accordance with the average and the sound field condition signal.

These and other objects and features of the present invention will become more apparent from the following detailed description with reference to the accompanying drawings.

BRIEF DESCRIPTION OF DRAWINGS

FIG. 9a is a graph describing a ringing cycle of the conventional telephone bell;

FIG. 9b is a graph showing components of the tone of the bell of FIG. 9a; and

DETAILED DESCRIPTION OF THE PREFERRED EMBODIMENTS

Figure 1:
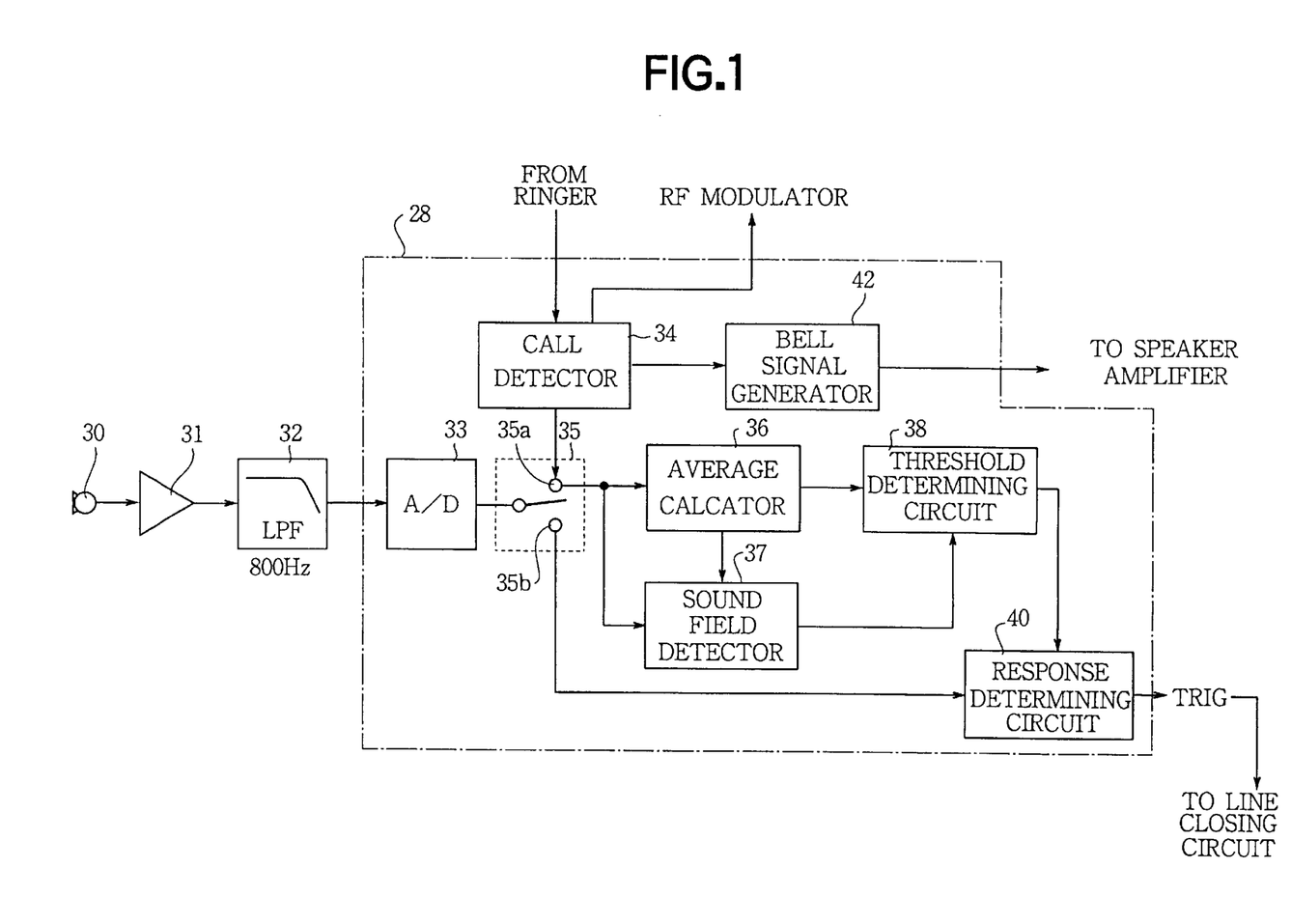
FIG. 1 is a block diagram of a telephone of the present invention.

Referring to FIG. 1, a telephone having an automatic audio response function according to the present invention is provided with a microphone 30 which picks up noises surrounding the telephone. The ambient noise is amplified by an amplifier 31 at a predetermined gain and fed to a low-pass filter (LPF) 32, the cut-off frequency of which is, for example, 800 Hz. The noises in a frequency range lower than 800 Hz is fed to an A/D converter 33 of a CPU 28. The CPU 28 corresponds to the CPU 2 of the conventional telephone shown in FIG. 7 and controls various components provided in the telephone such as a speaker, RF modulator and a line closing circuit.

The A/D converter 33 converts the ambient noises into a sound voltage signal representing a sound voltage level $a_n$ of the noises. The voltage signal is fed to a changeover switch 35 having fixed contacts 35a and 35b. The movable contact of the changeover switch is normally connected with the contact 35a. When there is an incoming call, a call detector 34 detects a bell signal from a ringer (not shown) which is similar to the ringer 1 in FIG. 7, and operates the changeover switch 35 to connect the movable contact thereof with the fixed contact 35b.

The voltage signal, during the normal operation, is fed to an average calculator 36 through the contact 35a of the changeover switch 35. The average calculator 36 calculates an average Av of the ambient sound levels in accordance with the following equation.

$$Av = \frac{\sum_{n=m}^{m+127} a_n - \frac{\sum_{n=m}^{m+127} a_n}{128} + a_{(m+128)}}{128}$$

wherein each of the references n and m represents a natural number.

The equation above is converted into the following equation when m=1.

$$Av = \frac{(a_1 + a_2 + \cdots a_{128}) - \frac{\sum_{n=1}^{128} a_n}{128} + a_{129}}{128}$$

In the present embodiment, the voltage signal of the ambient noises is applied to the average calculator 36 every 1.5 seconds (20 ms×75), and the noise average Av of the last 128 sound levels $a_n$ is calculated. Namely, the calculated average Av is for the period of time of 1.5 seconds×128 times=192 seconds, that is for three minutes and 12 seconds and the average is updated every 1.5 seconds.

The noise average Av is fed to a threshold determining circuit 38 wherein a threshold Th for determining whether the latest sound level represents a vocal response to the ringing bell of the telephone is calculated. In order to avoid an erroneous operation, The threshold Th is obtained by adding a predetermined value as a margin to the noise average Av calculated at the average calculator 36 and changes from time to time dependent on the ambient sound field. The calculated threshold Th is applied to a response determining circuit 40.

In the present invention, the threshold Th calculated by the threshold determining circuit 38 is corrected to cope with various sound field conditions. More particularly, in a room where an air conditioner is driven, the running noise generated by the air conditioner is the major noise. The running noise is small and the sound level thereof fluctuates very little. When a television set is turned on in the same room, the television becomes a major noise source and the sound level thereof largely fluctuates in accordance with the program in progress. Therefore, in order to prevent the incorrect operation of the telephone, it is necessary to set the threshold higher in the sound field where the sound level changes more than in the sound field where the sound level changes less.

In order to correct the threshold Th, the sound level $a_n$ is further applied to a sound field detector 37 to which the noise average Av is also fed.

The sound field detector 37 compares the latest sound level $a_n$ with the noise average Av including the latest sound level. When the difference between the sound level $a_n$ and the noise average Av is out of the range of ±0.04 V of the average Av (±3 dB by the microphone input), the sound field detector 37 determines a sound field with large fluctuations. On the other hand, when the difference falls within the range of ±0.04 V of the average Av, a sound field with small fluctuations is detected.

In consideration of the fact that the condition of the sound field is constantly changing, and of the influences of the incorrect operation of the telephone, in the sound field where the fluctuation of the sound level is large, the threshold may be immediately increased. If it is thereafter determined consecutively ten times that the fluctuation is small, the threshold is decreased to the original value.

Experiments have shown that it is further advisable to control the margin, which is added to the noise average Av to obtain the threshold Th at the threshold determining circuit 38, in accordance with the absolute value of the surrounding noise. Namely, the margin is increased in a noisy surrounding. This complies with the human behavior. As the surrounding become noisy, people instinctively raise their voices.

Hence in the present invention, the margin is determined in each sound field condition as follows based on the experiments.

(1) When the ambient sound level detected by a sound level meter is lower than 70 dB or 62.5 dB by a standard microphone output, and the fluctuation of the sound field is small, the threshold Th is calculated in accordance with, Th=Av+0.14 V (6 dB by microphone input level)

(2) When the ambient sound level is lower than 70 dB and the fluctuation of the sound field is large, the threshold Th is calculated in accordance with, Th=Av+0.40 V (13 dB by microphone input level)

(3) When the ambient sound level is higher than 70 dB and the fluctuation of the sound field is small, the threshold Th is calculated in accordance with, Th=Av+0.20 V (8 dB by microphone input level)

(4) When the ambient sound level is higher than 70 dB and the fluctuation of the sound field is large, the threshold Th is calculated in accordance with, Th=Av+0.60 V (20 dB by microphone input level)

When the call detector 34 detects that there is an incoming call, the output signal thereof is applied to a bell signal generator 42. The bell signal generator 42 produces a bell signal which is applied to a speaker amplifier similar to the amplifier 6 in FIG. 7. Thus the telephone bell is sounded through a speaker of the telephone to announce the incoming call. In the present embodiment of the invention, the bell tone is adapted to change alternately from 1800 Hz lasting 16 ms to 2000 Hz lasting 64 ms, thereby maintaining sufficient sound pressure and rendering the bell sound mellow.

The output signal of the call detector 34 is further fed to an RF modulator which is similar to the RF modulator 13 of FIG. 7, thereby transmitting the signal to the cordless phone shown in FIG. 8. Thus bell is also rung through the speaker of the cordless telephone. In the present embodiment, the bell is rung at a single frequency of 2000 Hz so that the bell tone of the main telephone and the bell tone of the cordless telephone can be audibly discerned. Since the frequencies of the bell tones of both phones are set at high frequencies of 1800 Hz and 2000 Hz, they are largely attenuated at the LPF 32.

The output signal of the call detector 34 is further fed to the changeover switch 35 to change the connection of the contacts as hereinbefore described. Hence the voltage signal representing the sound level $a_n$ is no longer fed to the average calculator 36 and the sound field detector 37. The threshold Th is thus determined at the threshold determining circuit 38 based on the latest sound level.

While the telephone is ringing, a response voice spoken by an addressee in response to the ring is picked up by the microphone 30 to produce a response voice signal which is fed to the response determining circuit 40 through the amplifier 31, LPF 32, A/D converter 33 and the changeover switch 35. The response determining circuit 40 rectifies a voice signal generated at the A/D converter 33. The level of the voice signal is then compared with the threshold Th. When it is detected that the level of the voice signal is higher than the threshold Th, it is determined that the voice signal is a response to the telephone bell, demanding the connection of the line. A trigger pulse TRIG is hence fed to a line closing circuit which is similar to the closing circuit 9 of FIG. 7, thereby connecting the line.

The operation of the response determining circuit 40 is described hereinafter in detail with reference to FIGS. 2a to 2d.

Figure 2:
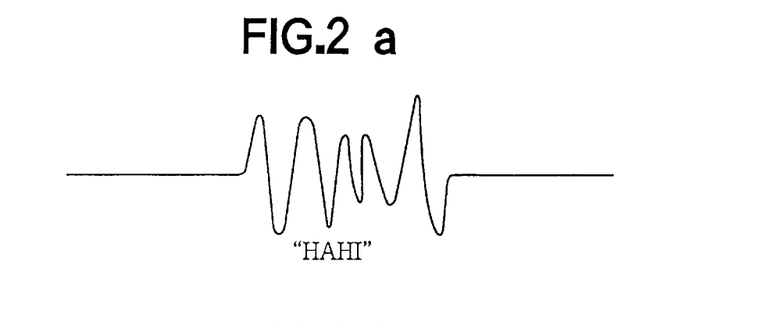
FIGS. 2a to 2d show various waveforms of a vocal response for explaining the operation of the telephone.

A Japanese word "Hahi" which corresponds to the English "yes" is a common response when answering a telephone. The word has a waveform shown in FIG. 2a. At the response determining circuit 40, the waveform is first of all, rectified into a halfwave as shown in FIG. 2b, and further converted to a voltage as shown in FIG. 2c. As shown in FIG. 2d, the level of the rectified waveform is detected at a sampling interval T1, which is, in the present embodiment, 20 ms. Each detected level is compared with the threshold Th. The following data train shows the result of the comparison.

(a) H H L L H H wherein H indicates the sampled sound level which is higher than the threshold Th, and L indicates the sampled sound level which is lower. Another spoken voice may result in a data train, (b) H H H L L L H The word "hahi" is often pronounced to extend the middle portion thereof, so that the sound pressure in the middle portion often drops below the threshold as shown in FIG. 2d and as in the examples (a) and (b). Hence, neither of the examples (a) and (b) qualify as the response to the telephone bell so that the line is not connected despite the speaker's intention.

In order to prevent such a hindrance, chattering of the data is absorbed in the present invention. More particularly, a single or two consecutive L-data are ignored and considered as the H-data. Only when three L-data are continued, is the L-data recognized. That is, in the example (a), the two L-data are recognized as the H-data so that the above data train (a) is converted into a data train,

H H H H H H

In the data train of the example (b), only the three L-data are recognized, so that the converted data train is shown as follows.

H H H H L H

Figure 3:
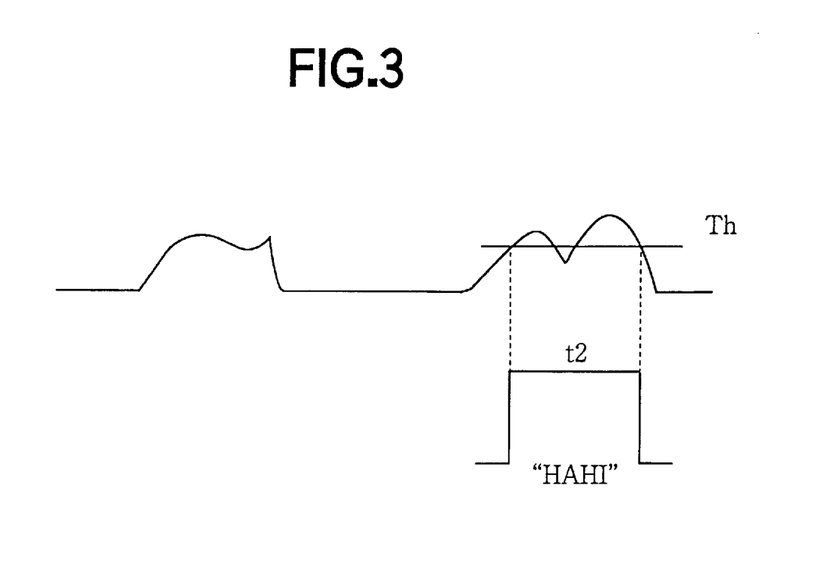
FIG. 3 shows a waveform of a vocal response explaining the characteristics thereof.

The response determining circuit 40 further calculates a length of time t2 from a time when the sound level exceeds the threshold Th to a time when the sound level falls below the threshold Th as shown in FIG. 3. When the time t2 is within a range between 250 ms and 760 ms, the response determining circuit 40 determines that the input signal represents a response to the telephone bell. Namely, in the example (a), the time corresponding to the entire data train comprising the six H-data is calculated. In the example (b), the time taken by the first four H-data is calculated. Hence, in the present invention, by correcting the data of the extended portion of the response, the response can be easily detected.

The fact that two frequencies 2000 Hz and 1800 Hz are used in ringing the bells in the present embodiment causes a trouble. The bell tone at each frequency are cut off at the LPF 32 if generated alone so that there is no possibility of erroneously determining the bell tone as a vocal response. However, since the ringing timings of the bells of the main telephone and the cordless telephone are not controlled, the bells may ring simultaneously. In particular, when the main telephone rings at the frequency of 1800 Hz while the cordless telephone rings at the frequency of 2000 Hz, there is generated a difference tone due to a difference frequency of 200 Hz (2000−1800=200). The frequency of the difference tone is low enough to pass through the LPF 32 and is applied to the response determining circuit 40. The response determining circuit 40 may hence erroneously determine the difference tone as a vocal response. In order to prevent such an error, the threshold is further corrected during the ringing of the bells.

More particularly, the sound level generated under the existence of the difference tone was measured with a sound level meter beforehand, and was found to be 0.314 V. The threshold is determined dependent on whether or not the main telephone is ringing and whether the threshold calculated by the threshold determining circuit 38 when a call is made is lower or higher than 0.314 V. Namely, when the calculated threshold is lower than 0.314, the threshold is set at 0.314 when the main telephone is ringing, and set at the calculated value during the pause. If the calculated threshold is higher than 0.314 V, it means that the ambient noise is higher than the difference tone. Thus the threshold is kept at the originally calculated value regardless of the ringing conditions of the bells.

In order to prevent the erroneous operation caused by the difference tone, a band-pass filter may be provided instead of the LPF 32 to cut off the low frequencies as well as the higher frequencies. Thus the difference tone as well as the bell tones are cut off. The erroneous operation may further be prevented by detecting that the length of the difference tone, which lasts 16 ms at maximum in the above-described embodiment, is much shorter than the usual response, "hahi."

The operation of the telephone of the present invention is described hereinafter with reference to FIGS. 5 and 6.

Figure 5:
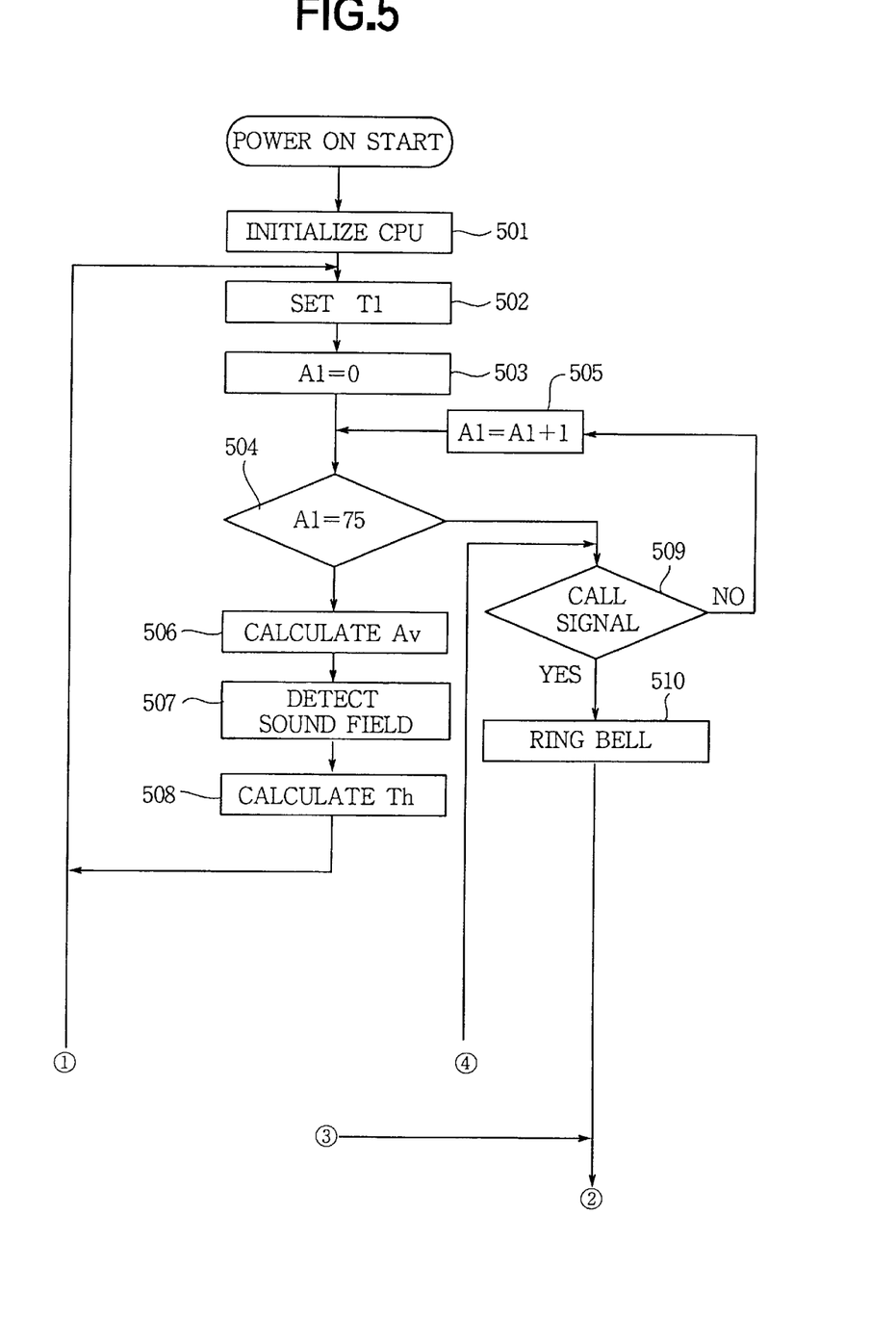
FIGS. 5 and 6 show a flowchart describing the operation of the telephone of the present invention.
Figure 6:
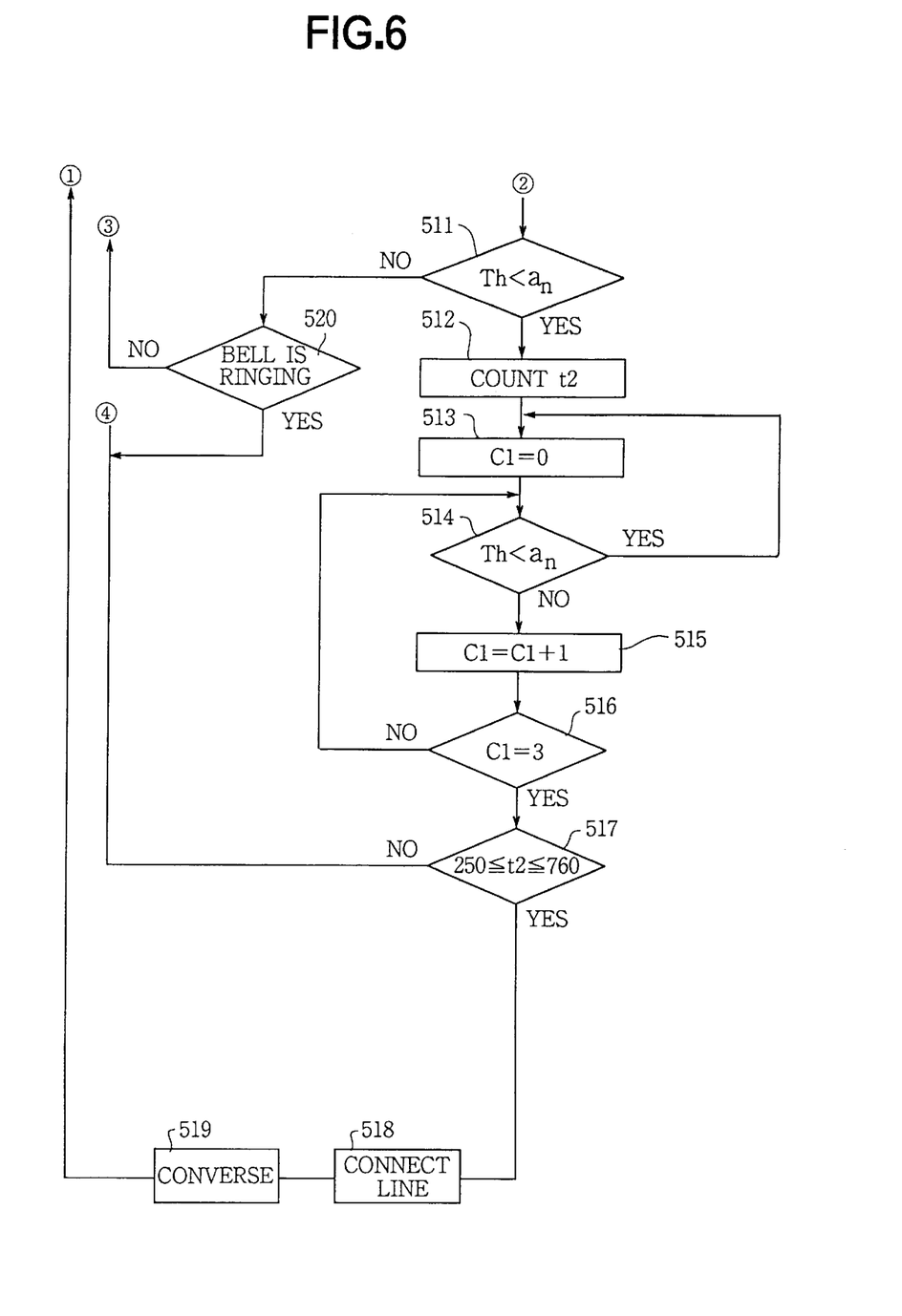

Referring to FIGS. 5 and 6, at a step 501, the CPU 28 is initialized and at a step 502, the sampling interval T1, which is the interval the sound voltage levels are fed, is set at 20 ms. At a step 503, a count A1 is reset. The count A1 is the number of times the sampling of the sound level is carried out at the interval T1. When it is determined at a step 504 that the count A1 is not yet 75, that is, 1.5 seconds (20 ms×75=1.5 sec) have not passed since the start of the sampling, the program goes to a step 509 where it is determined whether there is a call signal. If there is no call signal, the count A1 is count up at a step 505 and the program then returns to the step 504.

When the count reaches 75 at the step 504 and 1.5 seconds have passed, the noise average Av of the sound levels $a_n$ is calculated at a step 506. The conditions of the sound field is determined in accordance with the conditions (1) to (4) as described above, and the threshold Th is determined based on the noise average Av and the sound field conditions at a step 508. Thereafter, the program returns to the step 503. The steps 503 to 509 are repeated thereby to update the threshold Th every 1.5 seconds while waiting for an incoming call.

When it is determined at the step 509 that there is applied a call signal, the bell of the telephone starts to ring at a step 510, repeating the cycle of the ringing and the pause. The latest sound level $a_n$ is compared with the threshold Th at a step 511. If the sound level is higher than the threshold Th, the program proceeds to a step 512 where a timer starts to count the time t2 to determine whether the word "hahi", for example, is spoken in response to the ringing bell. At a step 513, a count C1 for determining the number of the L-data is reset.

The sound level $a_n$ is again compared with the threshold Th at a step 514. If the sound level $a_n$ is still higher than the threshold Th, the program returns to the step 513 and the steps 513 and 514 are repeated until the sound level $a_n$ becomes lower than the threshold Th.

When it is determined at the step 514 that the sound level $a_n$ is lower than the threshold Th, the count C1 is count up at a step 515, namely the count C1 becomes one. At a step 516, it is determined that the count C1 is less than three and returns to the step 514 to compare the next sound level $a_n$ with the threshold Th. If the sound level is still lower than the threshold, the count C1 becomes two at the step 515. If the next sound level $a_n$ becomes higher than the threshold Th, that is, if the H-data is obtained, the program goes from the step 514 to the step 513 where the count C1 is reset.

Namely, if the count C1 is smaller than three, the reduction in the sound level is deemed as a decline during the extended middle portion of the word "hahi", and the word is continued. Thus, the chattering of the sound level is absorbed.

If the count C1 becomes three, it is determined at a step 516 whether the count time t2 is within the range between 250 ms and 760 ms. Only when the time t2 is in the range, the response for answering the telephone is detected. The program then proceeds to a step 518 where the line is connected and the user can converse with the addresser at a step 519. If the time t2 is not in the said range, since there was no vocal response, the program returns to the step 509 to wait for the next call.

When it is determined at the step 511 that sound level $a_n$ is lower than the threshold Th, it is determined at a step 520 whether the sound level is input during the ringing of the bell or during the pause of the bell. If it is during the pause, the program returns to the step 511. However, if it is during the ringing, the threshold Th is corrected based on whether the calculated threshold Th at the step 508 is 0.314 V.

The telephone according to the second embodiment of the present invention is provided with an alarm function, which is usually called a morning call function.

Figure 4:
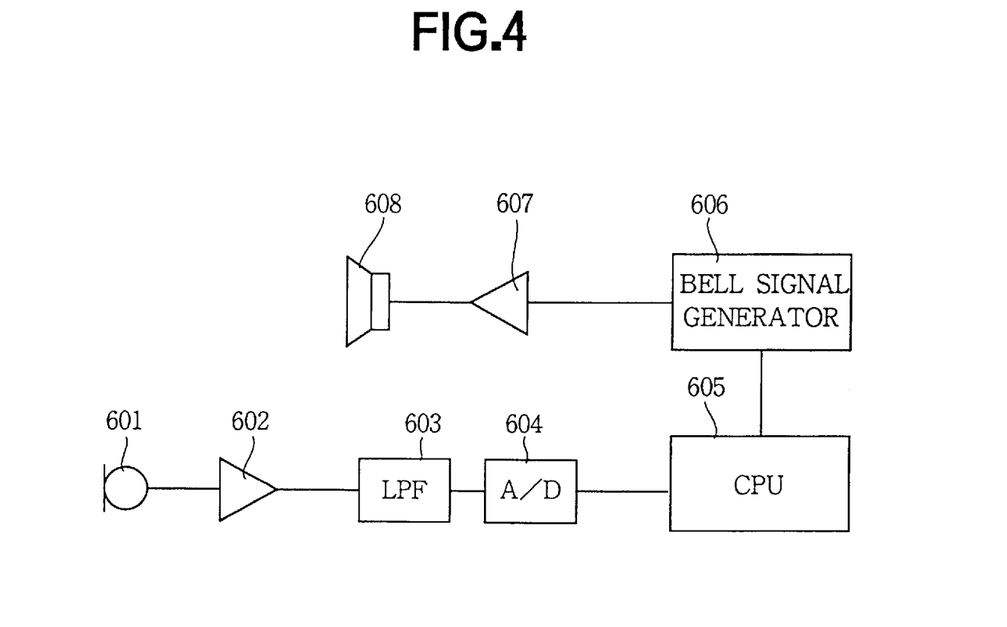
FIG. 4 is a block diagram of another embodiment of the telephone of the present invention.

Referring to FIG. 4, the telephone comprises a CPU 605 having a timer which is started when the user sets a desired time at which an alarm is to be sounded. At the same time, the ambient noise is picked up by an microphone 601 and fed to an LPF 603 through an amplifier 602. The undesired components of the ambient noise is eliminated by the LPF 603 and the noise is converted into a digital signal by an A/D converter 604 and fed to the CPU 605. When the time set at the timer of the CPU 605 is up, the CPU 605 applies a control signal to a bell signal generator 606. The bell signal generator 606 thus generates a bell signal which is fed to a speaker 608 through an amplifier 607, thereby sounding a bell tone. When a voice signal which is higher than a threshold calculated beforehand is picked up by the microphone 601, the bell signal generator 606 stops generating the bell signal. Hence the alarm can be stopped without operating a switch by the hand. The present embodiment can also be applied to an alarm clock.

The present invention can be modified in various manners. For example, a frequency spectrum of the input voice is detected when detecting the sound level thereof to accurately discriminate natural human voice from other sounds such as voice coming from a television set. Hence, the erroneous operation of the telephone can be prevented.

Furthermore, it is possible to modify the telephone so that a voice of a particular person or a particular word is registered in the telephone and the line is connected only when the telephone is answered by the registered person or the particular word is spoken. The line is connected when the sound level exceeds the threshold in the modification so that the erroneous operation can be positively prevented.

From the foregoing it will be understood that the present invention provides a telephone having an automatic audio response function wherein a vocal response is detected by comparison with a threshold depending on a length of the response, thereby preventing an erroneous operation of the telephone. The vocal response is further discriminated from the bell tone so that the response can be accurately detected even when the bell is ringing. The threshold is determined in accordance with the sound level of the ambient noise. When the surrounding is quiet, a small vocal response will connect the telephone line. The response can also be easily detected in a noisy surrounding.

While the invention has been described in conjunction with preferred specific embodiment thereof, it will be understood that this description is intended to illustrate and not limit the scope of the invention, which is defined by the following claims.

What is claimed is:

1. A telephone having an audio response function, the telephone having a bell signal generator to generate a bell tone in response to an incoming call, comprising:

a microphone system for picking up ambient sounds including noises and for producing a sound voltage signal;

average calculator means for calculating an average of the noise picked up by the microphone system;

threshold determining means for generating a threshold for determining, in accordance with the average, a response voice spoken in response to the bell tone;

response determining means for comparing a response sound voltage fed from the microphone system, wherein said response sound voltage is based on the response voice, with the threshold, and for producing a response voice signal when the comparison is established; and closing means responsive to the response voice signal for closing a line of the telephone.

2. The telephone according to claim 1 wherein the threshold determining means generates a threshold based on the sound voltage signal.

3. The telephone according to claim 1 further comprising sound field detector means for comparing a present sound voltage signal with the average and for producing a sound field condition signal, the threshold determining means being provided for determining the threshold in accordance with the average and the sound field condition signal.

4. The telephone according to claim 1 wherein the average calculator means periodically recalculates the average for updating the calculated average based on the recalculated average.

5. A telephone having an audio response function, the telephone having a bell signal generator to generate a bell tone in response to an incoming call, comprising:

a microphone system for picking up ambient sounds including noises and for producing a sound voltage signal;

an average calculator which calculates an average of the noise picked up by the microphone system;

a threshold calculator for generating a threshold for determining, in accordance with the average, a response voice spoken in response to the bell tone;

a comparator for comparing a response sound voltage fed from the microphone system, wherein said response sound voltage is based on the response voice, with the threshold, and for producing a response voice signal when the comparison is established; and a line closing circuit responsive to the response voice signal for closing a line of the telephone.

* * * * *